(12) United States Patent
Kaizer et al.

(10) Patent No.: US 12,425,228 B1
(45) Date of Patent: Sep. 23, 2025

(54) METHODS AND SYSTEMS FOR BLOCKCHAIN NAME IDENTIFIERS

(71) Applicant: VeriSign, Inc., Reston, VA (US)

(72) Inventors: Andrew Kaizer, Arlington, VA (US); Swapneel Sheth, Fairfax, VA (US)

(73) Assignee: Verisign, Inc., Reston, VA (US)

( * ) Notice: Subject to any disclaimer, the term of this patent is extended or adjusted under 35 U.S.C. 154(b) by 118 days.

(21) Appl. No.: 18/212,656

(22) Filed: Jun. 21, 2023

Related U.S. Application Data

(60) Provisional application No. 63/354,091, filed on Jun. 21, 2022.

(51) Int. Cl.
*H04L 9/32* (2006.01)
*H04L 9/00* (2022.01)

(52) U.S. Cl.
CPC .............. *H04L 9/3247* (2013.01); *H04L 9/50* (2022.05)

(58) Field of Classification Search
CPC ...... H04L 9/3247; H04L 9/50; H04L 61/3025
See application file for complete search history.

(56) References Cited

U.S. PATENT DOCUMENTS

| | | | | |
|---|---|---|---|---|
| 11,797,655 | B1 * | 10/2023 | Kaizer | G06Q 20/3678 |
| 12,147,978 | B2 * | 11/2024 | Gauvreau, Jr. | G06Q 20/389 |
| 2020/0328883 | A1 * | 10/2020 | Kaizer | H04L 61/4511 |
| 2020/0351240 | A1 * | 11/2020 | Gould | H04L 9/3247 |
| 2021/0135867 | A1 * | 5/2021 | Zeng | H04L 9/50 |
| 2022/0103370 | A1 * | 3/2022 | Alwen | H04L 61/45 |
| 2023/0336523 | A1 * | 10/2023 | DeLuca | H04L 63/0815 |

FOREIGN PATENT DOCUMENTS

EP 4468654 A1 * 11/2024 .......... H04L 61/4511

* cited by examiner

*Primary Examiner* — Kostas J Katsikis
(74) *Attorney, Agent, or Firm* — Lee & Hayes, P.C.

(57) ABSTRACT

A computer-implemented method includes: receiving a first request from a registrant to associate a domain name with a blockchain address; transmitting the first request to a registry, wherein the registry is configured to digitally sign the first request; submitting the digitally signed data from the first request or transformation of the data from first request to a first blockchain contract, wherein the first blockchain contract is configured to store the associated domain name as a first blockchain identifier; determining a deployment of a second blockchain contract by the registrant; transmitting a second request to the registrant to associate a subdomain of the associated domain name as a second blockchain identifier for the second blockchain contract; receiving, from the registrant, an indication to use the subdomain as the second blockchain identifier for the second blockchain contract; transmitting the second request to a registry, wherein the registry is configured to digitally sign the second request; submitting the digitally signed data from the second request or transformation of the data from second request to a second blockchain contract, wherein the second blockchain contract is configured to store the associated domain name as a second blockchain identifier.

12 Claims, 15 Drawing Sheets

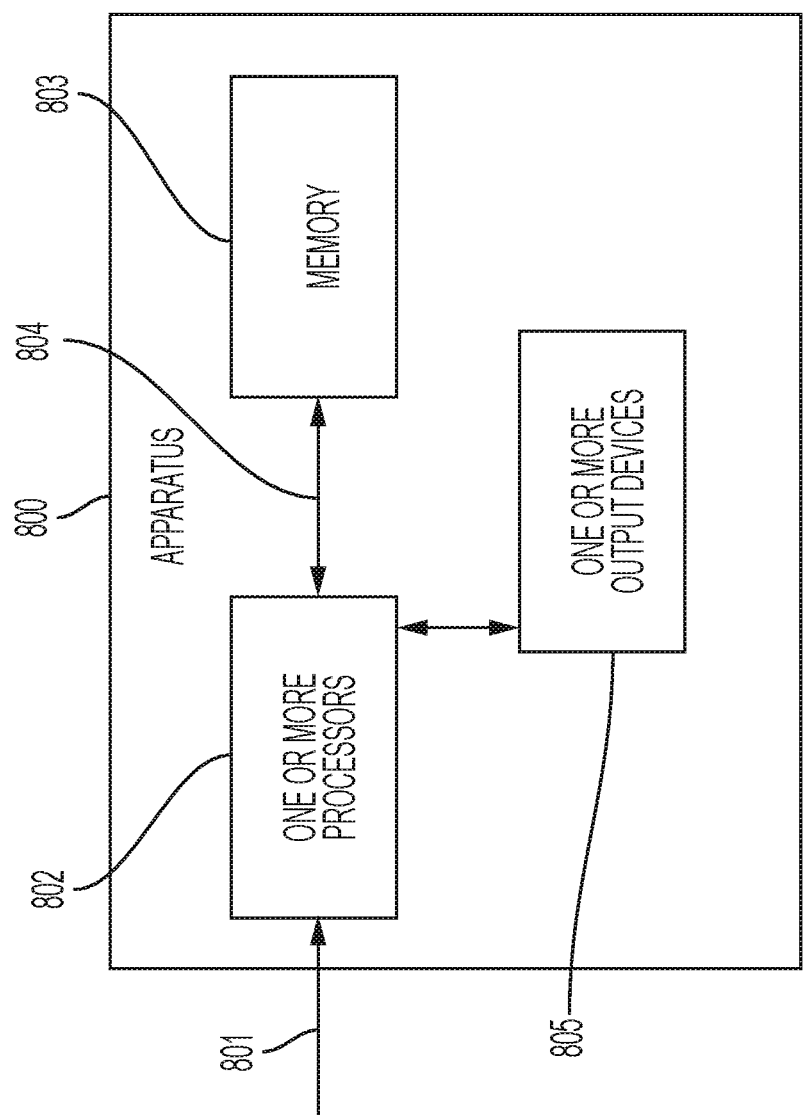

METHODS AND SYSTEMS FOR BLOCKCHAIN NAME IDENTIFIERS

CROSS-REFERENCE TO RELATED APPLICATIONS

This application claims priority to U.S. Provisional Patent Application No. 63/354,091, filed on Jun. 21, 2022, the entirety of which is hereby incorporated by reference.

BACKGROUND

The domain name system (DNS) is a hierarchical distributed naming system for resources provided by computer servers that are connected to the Internet. The DNS associates domain names to numeric Internet Protocol (IP) addresses of Internet resources. Accordingly, the DNS may be considered a namespace that enables computers and humans to access networked resources, including web pages, using domain names. The DNS is the part of the Internet infrastructure that traditionally translates human-readable domain names into the Internet Protocol (IP) addresses needed to establish TCP/IP communication over the Internet. For example, the DNS allows users to refer to web sites, and other resources, using easier to remember domain names (e.g., www.example.com) rather than the addresses associated with a website or resource and assigned to computers on the Internet (e.g., the IP address 123.4.56.78). Each domain name can be made up of a series of character strings (labels) separated by dots. The rightmost label in a domain name is known as the "top-level domain" (TLD). Examples of well-known TLDs are "com"; "net"; "org" etc. Each TLD supports second-level domains, listed immediately to the left of the TLD, e.g., the "example" level in "www.example.com". Each second-level domain can include a number of third-level domains located immediately to the left of the second-level domain, e.g., the "www" level in www.example.com. Additional level domains may also be used, such as fourth-level, fifth-level, or other levels, by similarly separating each level with a dot.

The responsibility for operating each TLD, including maintaining a registry of the second-level or other level of domains within the TLD, for example, may be delegated to a particular organization, such as a domain name registry. During the domain name resolution process, the registry is primarily responsible, at least in part, for answering queries for IP addresses associated with domains, typically through DNS servers that maintain such information in large databases, and operating its top-level domain.

A registry, such as a DNS registry, may refer to an authoritative database of all domain names registered in a top-level domain or other level domain in which domain names can be registered. A registry may be operated at or below the TLD level. Accordingly, a registry operator may be a TLD operator or an operator of levels other than the TLD level. A registry may include many hardware computer servers operably coupled to the Internet. For ease of discussion, a registry may be identified with its hardware computer servers unless otherwise specified or clear from context.

A domain name may be registered with a registry through an entity authorized or accredited to register domain names, such as a registrar, on behalf of end users (e.g., registrants). A registrar may communicate with the registrant or end user directly, or the registrar may communicate with the registrant or end user indirectly through one or more layers of resellers. Registrars typically include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

Trusted service providers provide DNS-related services. For example, trusted service providers are not accredited registrar or registries. For example, web hosting providers provide the web server computers that serve the web pages associated with domain names. These entities are trusted service providers in the DNS context. As another example, DNS operators, such as resolvers, provide DNS resolution services separate from the distributed database of DNS data maintained by the DNS registries. Such DNS operators are also a type of trusted service provider. As yet another example, trusted service providers in the DNS context may act on a user's behalf, e.g., to enable DNS security extensions (DNSSEC) for a registrant's domain. Other trusted service providers may also exist.

A blockchain, for example, may be a decentralized, distributed, electronic ledger that records transactions, including but not limited to cryptocurrency transactions, or other information, as described presently. In general, a blockchain takes the form of a distributed readable and writeable computer interpretable data structure, stored in various computers (e.g., nodes) in the blockchain network.

A blockchain may be constructed from individual logical blocks. Each block may include any, or a combination of: a timestamp representing a time of the block's creation, a cryptographic hash of an identification of the previous block, and a payload, which includes data that may represent transactions or other information. The data in the blockchain payload may represent, for example, for each of a plurality of transactions, a transaction identifier, a transaction amount, and/or the address associated with the receiving party (such as the receiving party's public key).

Each participant in the blockchain network may be associated with a cryptographic asymmetric key pair, referred to as the participant's blockchain key pair, consisting of a public key (e.g., usable by the participant to receive cryptocurrency, or as an address to which another blockchain participant may send cryptocurrency) and a private key (e.g., usable by the participant to send cryptocurrency). In particular, the public key is associated with (e.g., usable to derive via cryptographic hash) a blockchain address held by a blockchain participant, and the private key may be owned or controlled and kept secret from the blockchain network (e.g., the user is responsible to ensure their cryptographic material is not inadvertently disclosed).

SUMMARY

According to an example embodiment, a computer-implemented method performed by a service provider computer, the computer comprising one or more processors and memory accessible by the one or more processors, the memory storing instructions that when executed by the one or more processors cause the computer to perform the method, the method comprises: receiving a first request from a registrant to associate a domain name with a blockchain address; transmitting the first request to a registry, wherein the registry is configured to digitally sign data from the first request or transformation of the data from the first request; submitting the digitally signed first request to a first blockchain contract, wherein the first blockchain contract is configured to store the associated domain name as a first blockchain identifier; determining a deployment of a second blockchain contract by the registrant; transmitting a second request to the registrant to associate a subdomain of the associated domain name as a second blockchain identifier for the second blockchain contract; receiving, from the registrant, an indication to use the subdomain as the second blockchain identifier for the second blockchain contract; and transmitting the second request to a registry, wherein the registry is configured to digitally sign the second request; submitting the digitally signed data from the second request or transformation of the data from second request to a second blockchain contract, wherein the second blockchain contract is configured to store the associated domain name as a second blockchain identifier.

According to an example embodiment, a computer-implemented method performed by a service provider computer, the computer comprising one or more processors and memory accessible by the one or more processors, the memory storing instructions that when executed by the one or more processors cause the computer to perform the method, the method comprises: receiving, from a registrant, a first request to associate a domain name with a blockchain address; transmitting the first request to a registry, wherein the registry is configured to digitally sign data from the first request or transformation of the data from the first request; submitting the digitally signed first request to a first blockchain contract, wherein the first blockchain contract is configured to store the associated domain name as a first blockchain identifier; receiving a second request from the registrant to deploy a second blockchain contract, wherein the second request includes an indication of a subdomain of the associated domain name to use as a second blockchain identifier for the second blockchain contract; and deploying the second blockchain contract on behalf of the registrant, wherein the second blockchain identifier is associated with a blockchain address of the second blockchain contract.

According to an example embodiment, a computer-implemented method performed by a service provider computer, the computer comprising one or more processors and memory accessible by the one or more processors, the memory storing instructions that when executed by the one or more processors cause the computer to perform the method, the method comprises: receiving a notification that a registrant of a first domain name associated with a blockchain address has deployed a blockchain contract, wherein the first domain name associated with the blockchain address comprises a first blockchain identifier; and notifying the registrant that the registrant is permitted to add the blockchain contract to a list of blockchain contracts associated with the first blockchain identifier.

According to an example embodiment, a computer-implemented method performed by a computer having a first blockchain contract, the computer comprising one or more processors and memory accessible by the one or more processors, the memory storing instructions that when executed by the one or more processors cause the computer to perform the method, the method comprises: receiving, by the first blockchain contract, a request from a domain name system (DNS) registrar to associate a first domain name with a first blockchain address, wherein the associated first domain name comprises a first blockchain identifier; receiving a notification from a registrar that a registrant has created a second blockchain contract; and submitting, to a blockchain registry contract, a notification to associate a second blockchain identifier with a second blockchain address of the second blockchain contract.

BRIEF DESCRIPTION OF THE DRAWINGS

FIG. 8 illustrates an example of an apparatus to implement one or more example embodiments discussed herein.

Various embodiments are described in detail below with reference to the accompanying drawings, in which like reference numerals represent like elements.

DETAILED DESCRIPTION

Figure 1A:
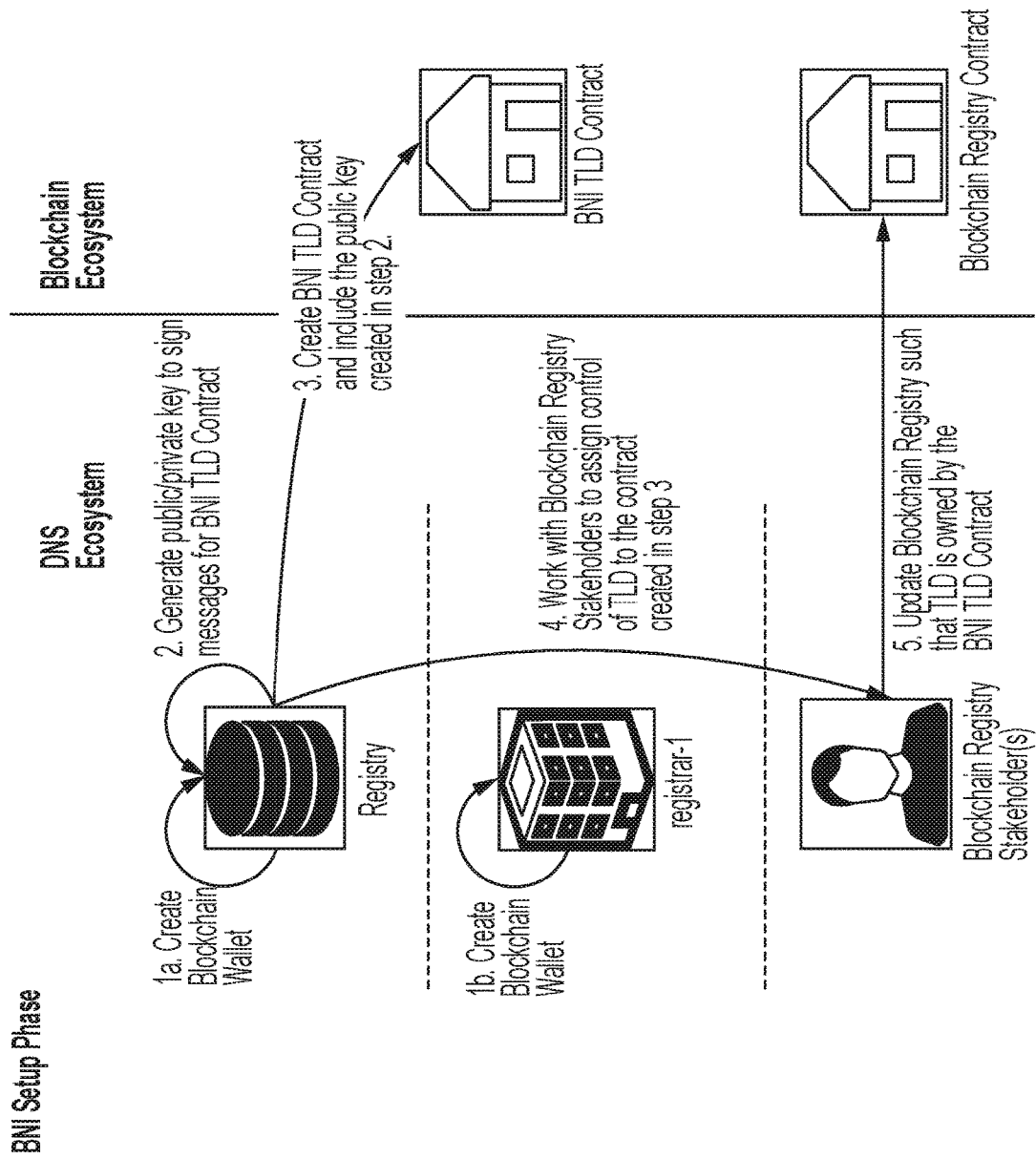
FIGS. 1A-1C are sequence diagrams illustrating a blockchain name identifier (BNI) model where a registrant goes to their registrar where they can set subdomains that are then added to the blockchain.

As recognized by the inventors, certain challenges currently exist with blockchain identifiers. For example, a blockchain participant's public key is long and unwieldly which makes the public key an inconvenient identifier. Some name services exist in the blockchain ecosystem for alternative namespaces, such as Handshake and Ethereum Name Service (ENS). These alternative namespaces, however, are separate from the existing DNS namespace.

To facilitate use of names, such as domain names of the DNS, in the blockchain ecosystem, a blockchain name identifier (BNI) provider may be configured to map domain names in the DNS name space to a namespace of the blockchain ecosystem. Some example BNI provider services are described with respect to FIGS. 1A-1C, discussed in more detail below. As described below, a blockchain name identifier or blockchain identifier may refer to a blockchain identifier that corresponds to an existing name in a first namespace, such as the DNS.

One outstanding issue in identification on blockchains or distributed ledgers relates to when contracts, such as blockchain contracts or smart contracts, are deployed on the blockchain and how the contracts are identified on the blockchain. Contracts may be deployed to a blockchain by sending the computer code of the contract with any optional initialization values, as a blockchain transaction. One approach is to label each contract with a blockchain identifier that corresponds to a name of a first namespace, such as a second level domain name of the DNS, that uniquely identifies the contract. However, second level domains are not the only possibility to achieve the objective of uniquely identifying a contract on a blockchain. For example, registrants of DNS domain names may want to further leverage their existing second level domain names by using a subdomain (e.g., a third level or greater level domain) or path of their existing second level domain name(s) (e.g., example.com/PATH or example.com/abc/123) as a blockchain identifier. For example, if the blockchain identifier example.com (in this example, the corresponding domain name is registered in the DNS to registrant Example Online Store) deploys a smart contract to handle payment escrow, the registrant or another user interacting with the smart contract (e.g., a customer of Example Online Store) may use the blockchain identifier escrow.example.com, which links the escrow smart contract to the blockchain identifier example.com or store the data in a way that attaches the data directly to the blockchain identifier example.com, thus increasing trust in the smart contract by blockchain users.

This is a similar trust model to existing DNS domain names. For example, if a user types the subdomain escrow.example.com in a conventional Internet browser, the user may typically assume whatever website or resource is fetched via the conventional DNS resolution process (e.g., the website or resource located at the IP address associated with the domain name or subdomain) belongs to Example Online Store (i.e., the DNS registrant of the domain name). In reality, Example Online Store can do whatever it wants with the subdomain so, for example, the subdomain may point to something else, such as website or resource not owned by Example Online Store. But that is a choice by the domain name registrant and not a choice controlled by registrant-registrar-registry (RRR) channel, the registrar, or the registry. Using a blockchain identifier corresponding to a registrant's domain name to point to a blockchain address or contract entails a similar trust model between internet or blockchain users and domain name registrants.

Figure 1B:
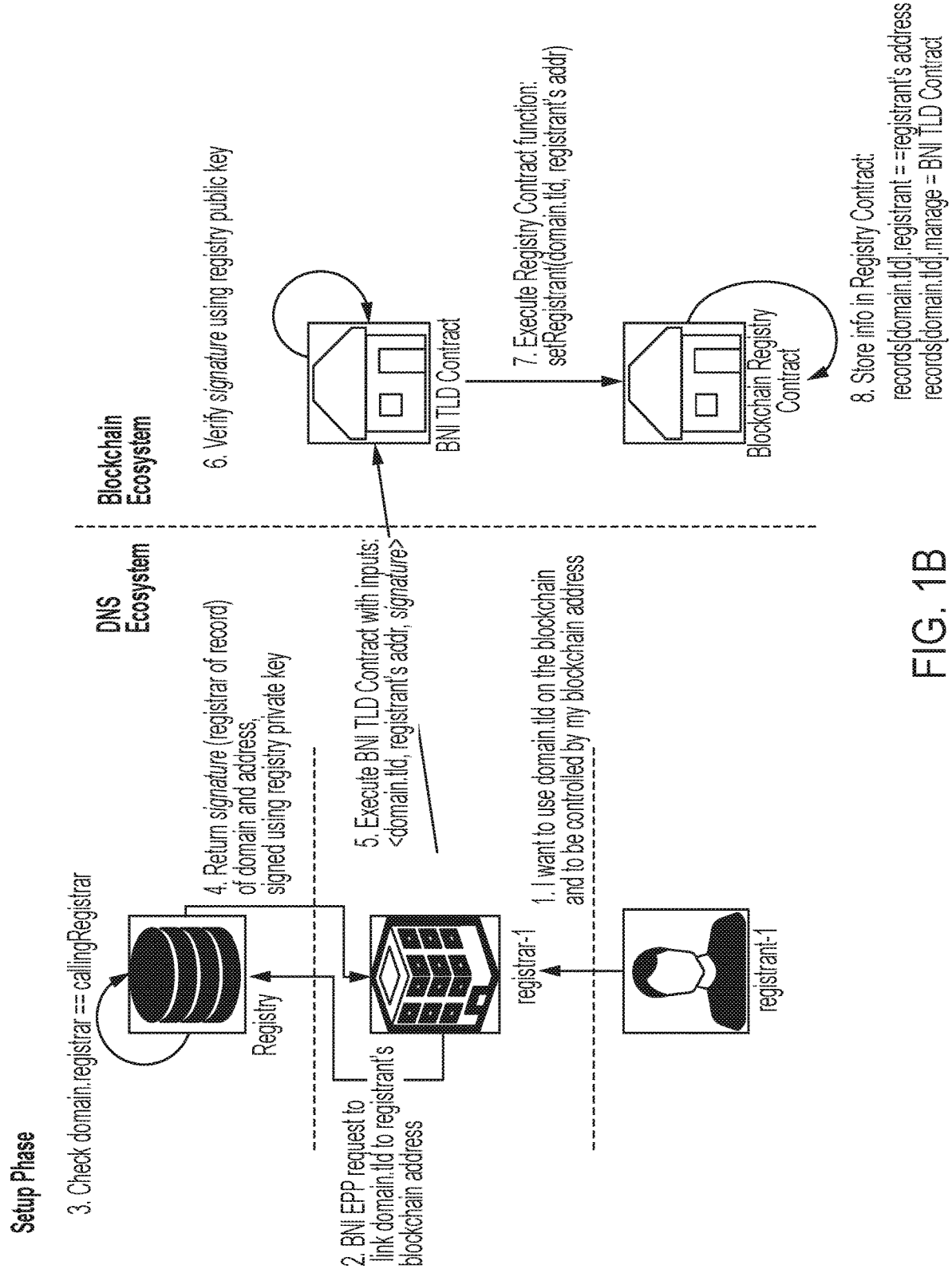
Figure 1C:
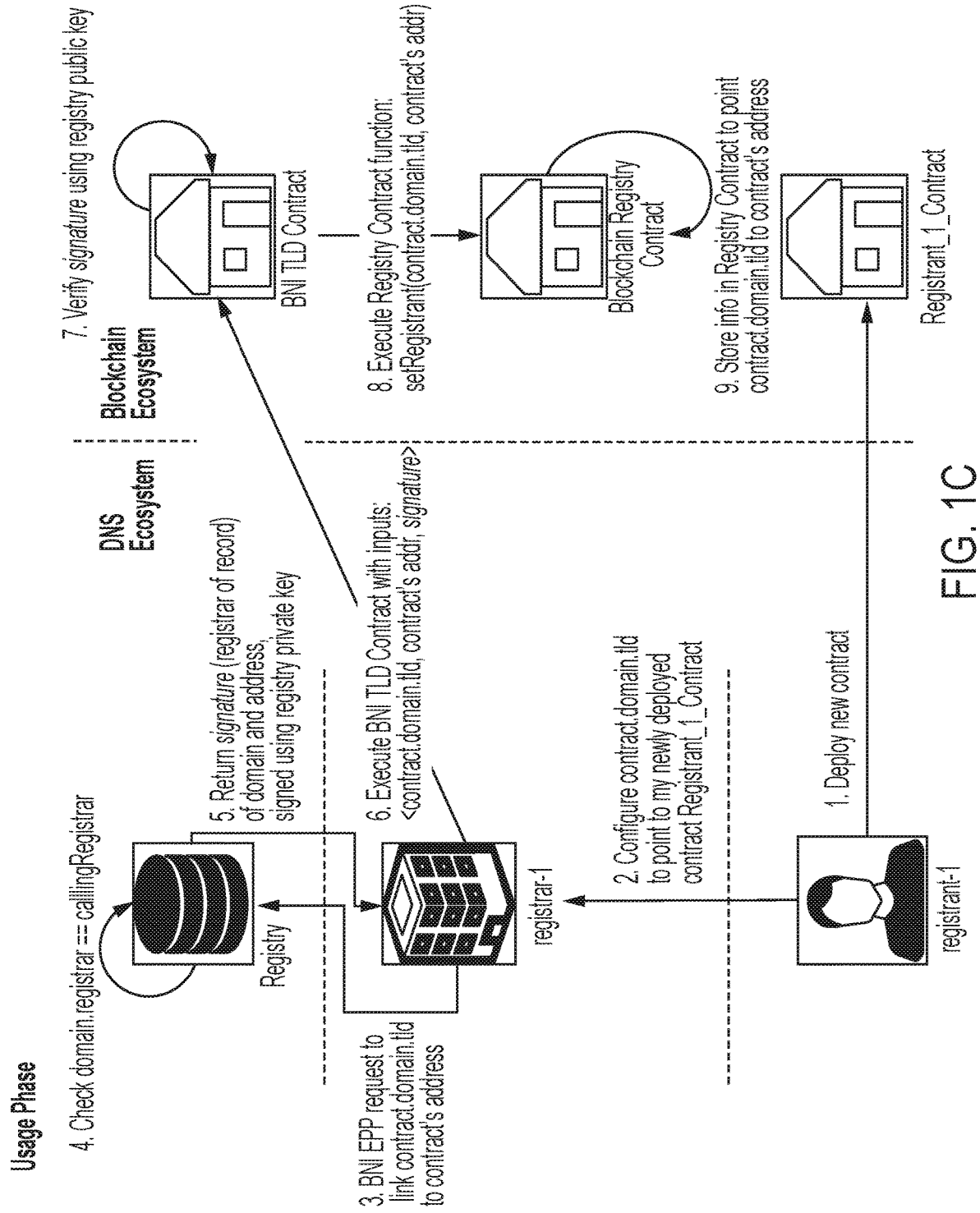

FIGS. 1A-1C are sequence diagrams illustrating a BNI approach where a registrant interacts with its domain name registrar to set subdomains that are then added as blockchain identifiers to the blockchain, as described in U.S. Pat. No. 10,721,060, which is incorporated herein by reference. In the illustrated example, subdomains and path-based approaches are described whereby a registrant interacts with its domain name registrar (or other entity as appropriate) and uses a user interface (UI)/user experience (UX) to set subdomains that are then added as blockchain identifiers to the blockchain.

In this approach, the registrant may first deploy a contract to the blockchain and then request that the domain name registrar push the blockchain identifier to the blockchain address for the contract (e.g., by sending the proof (e.g., step 6 of FIG. 1C) to execute the contract). Or if the registrant knows the blockchain address for a contract to-be-deployed on the blockchain, the registrant may request that the domain name registrar push the blockchain identifier to the blockchain address and then deploy the contract to the blockchain. Either way, however, this approach is not automated and the registrant must take at least two distinct steps to associate a blockchain identifier with a contract on a blockchain.

FIG. 1A illustrates a BNI setup phase. FIG. 1B illustrates a domain setup phase. Blockchain-based steps may be part of the same blockchain transaction and succeed or fail as a group. For example, steps 6 and 7 of FIG. 1B may be considered as subparts of a single step (e.g., steps 6a, 6b). The management functionality in step 8 may be required for the BNI TLD Contract to successfully add/remove subdomains/paths associated with a domain. This may be accomplished, for example, using a deed/proxy contract, setting the BNI TLD Contract as the registrant, etc. FIG. 1C illustrates the usage phase. Steps 8-9 are a generalization. In practice more steps may be needed to fully set up a blockchain identifier on the blockchain (e.g., deploy a resolver, add data to resolver, etc.).

Figure 2A:
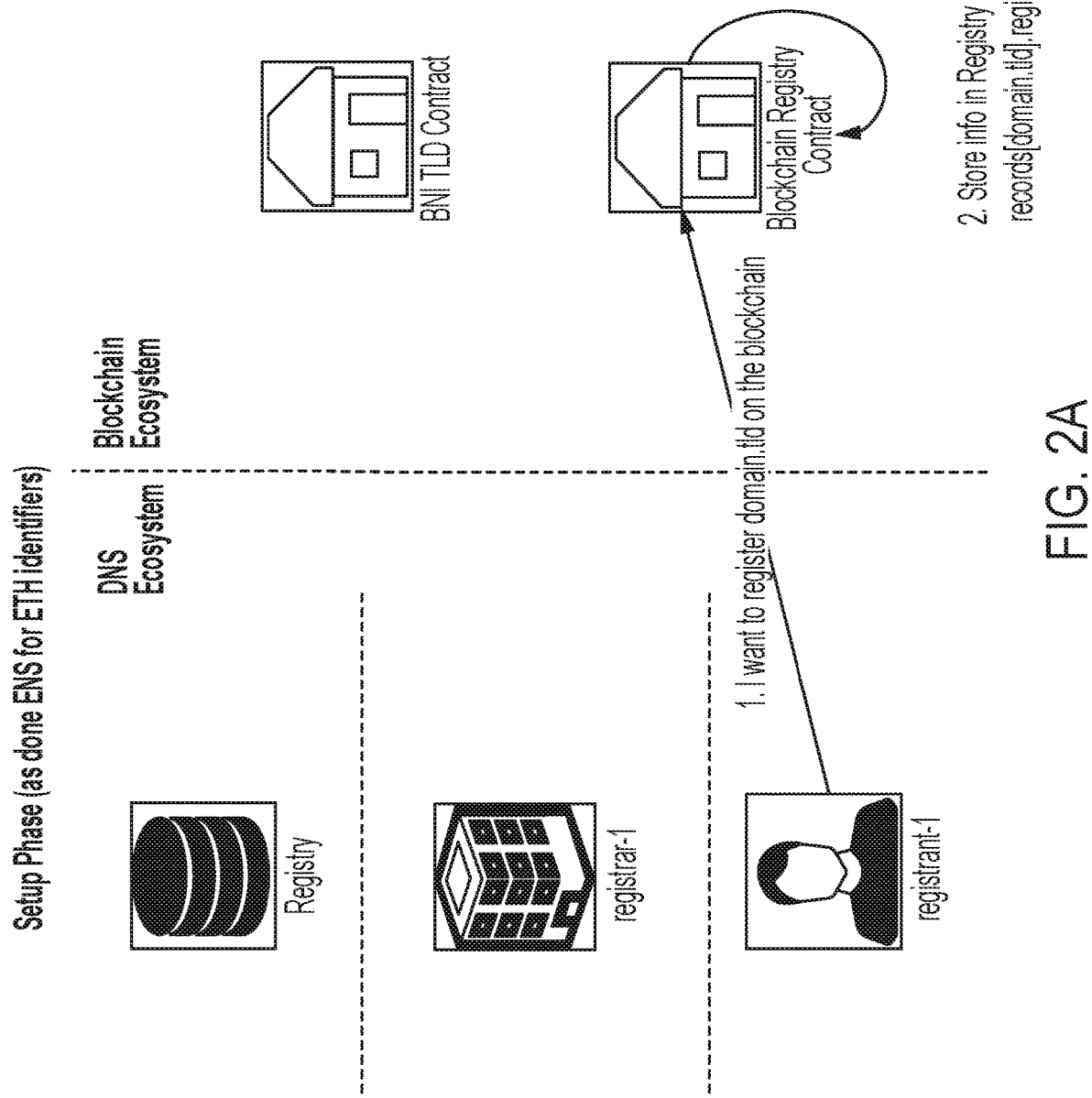
FIGS. 2A and 2B are sequence diagrams illustrating an implementation where users set subdomains on names they control and those names can point to a contract.
Figure 2B:
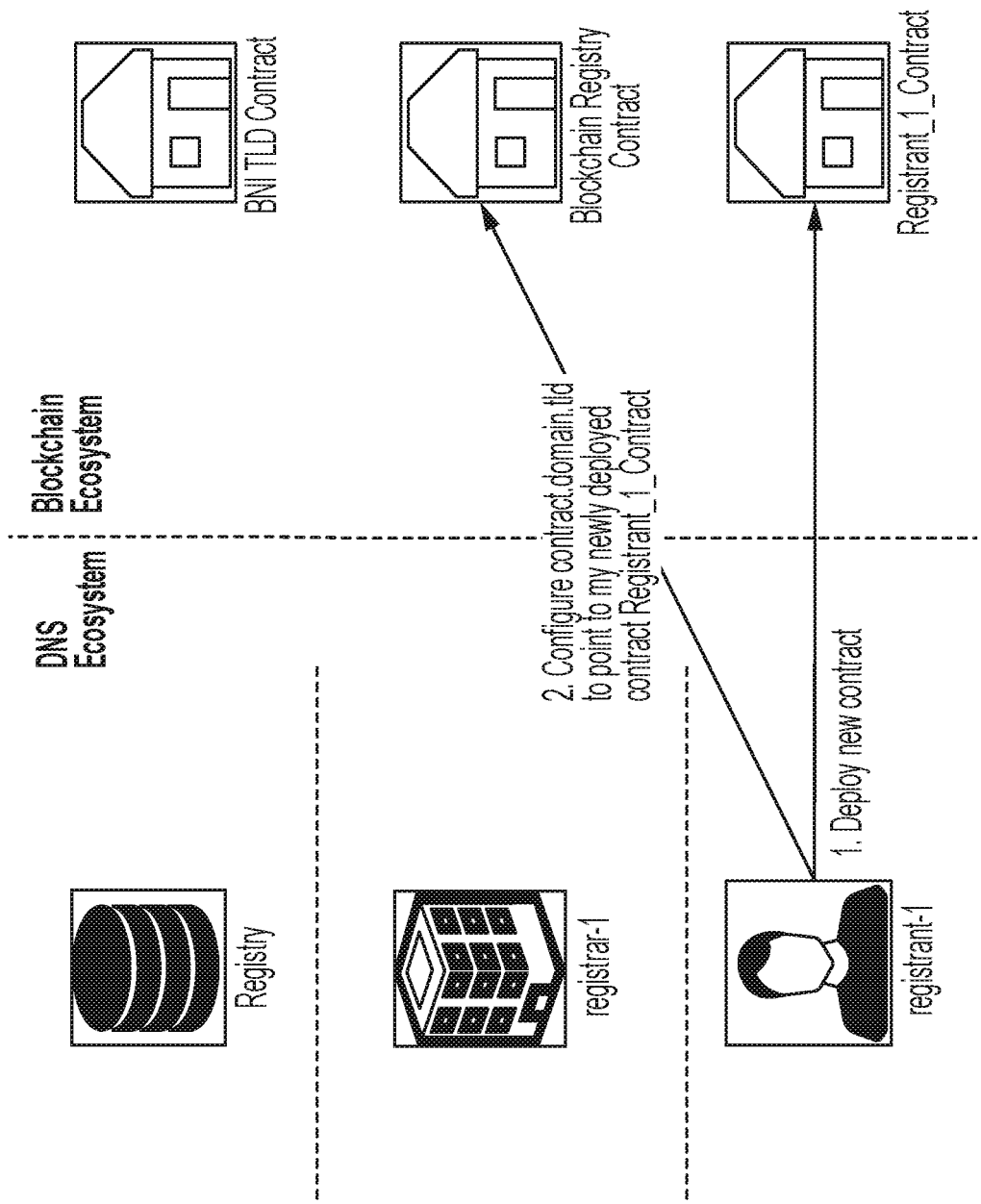

FIGS. 2A and 2B are sequence diagrams illustrating another approach where users set subdomains on names they control and those names can point to a contract. FIG. 2A illustrates the setup phase. For example, this approach has been employed by an Ethereum Name Service (ENS) such as .ETH for ENS or .CRYPTO for Unstoppable Domains, which are alternative roots from the global DNS. FIG. 2B illustrates the usage phase.

Particular embodiments are described to automate support for contract naming and enhance the ecosystem, such as enhancements to the BNI approach, by detailing various mechanisms to automate the process of creating these subdomains or paths and incorporating them into existing blockchain naming services. Various embodiments are described with respect to FIGS. 3-7B.

Figure 3:
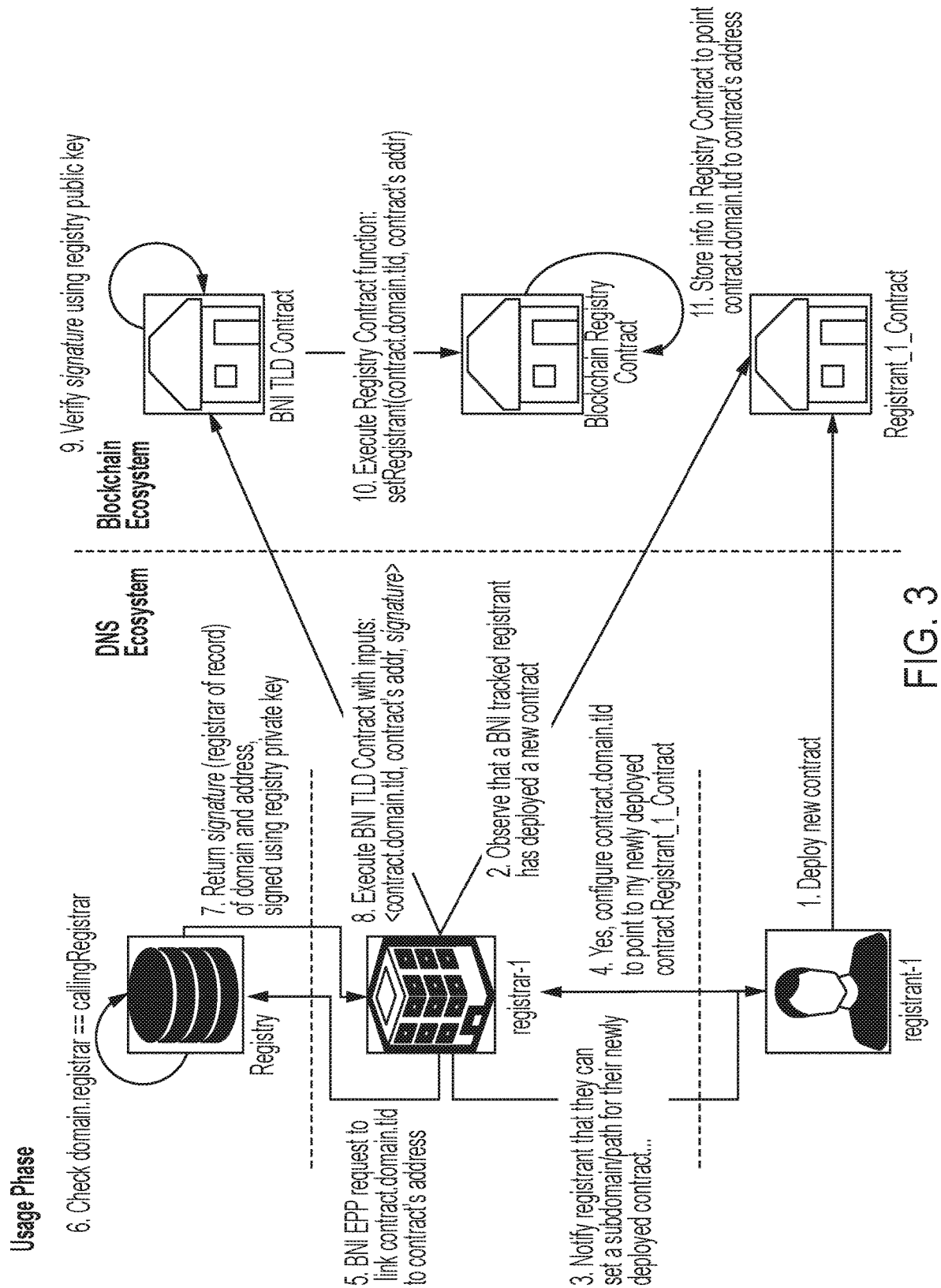
FIG. 3 is a sequence diagram illustrating a BNI monitoring system, according to particular embodiments.

FIG. 3 is a sequence diagram illustrating a monitoring system, according to particular embodiments. The setup phase for this embodiment may be the same as illustrated in FIG. 1B, such as described in U.S. Pat. No. 10,721,060, which is incorporated herein by reference. According to an embodiment, after a first blockchain identifier is deployed to the blockchain for registrant-1, such as using the BNI approach described above, a service provider(s) may monitor the first blockchain identifier on the blockchain to observe if and/or when the first blockchain identifier deploys any contracts on the blockchain (e.g., contracts deployed by registrant-1). The monitoring may be performed by observing, such as by a blockchain monitoring program, the public blockchain transaction information (e.g., transactions recorded in new blocks of the blockchain) to determine if or when the first blockchain identifier completes a blockchain transaction that deploys a contract to the blockchain. For example, the service provider may be registrar-1 that is the registrar of record for the domain name, a BNI provider, or a registrar that is contracted to be the BNI provider for the registrant, and/or the registrant's domain name. After a contract is deployed on the blockchain by the first blockchain identifier, the entity managing the service provider, the service provider, or BNI provider may contact or request the registrant-1 of the corresponding domain name (e.g., the registrant of the domain name in the DNS) to update the first blockchain identifier, such as via the BNI approach, to assign a second blockchain identifier to the newly deployed contract. For example, the second blockchain identifier may correspond to a subdomain or path of the corresponding domain name.

The illustrated embodiment may be automated in terms of identifying blockchain contract deployments, such as with the blockchain monitoring program, but may not be automated for setting the second blockchain identifier. Instead, the user is prompted to identify the deployed contract, and the user may decide to comply or ignore such a prompt.

According to an embodiment, the service provider (e.g., registrar-1) may identify a blockchain contract deployment by monitoring the blockchain, determining when the registrant's blockchain account (e.g., the registrant's blockchain identifier and/or blockchain address) makes a transaction, and observing if that transaction results in one or more new contracts being created.

Figure 4A:
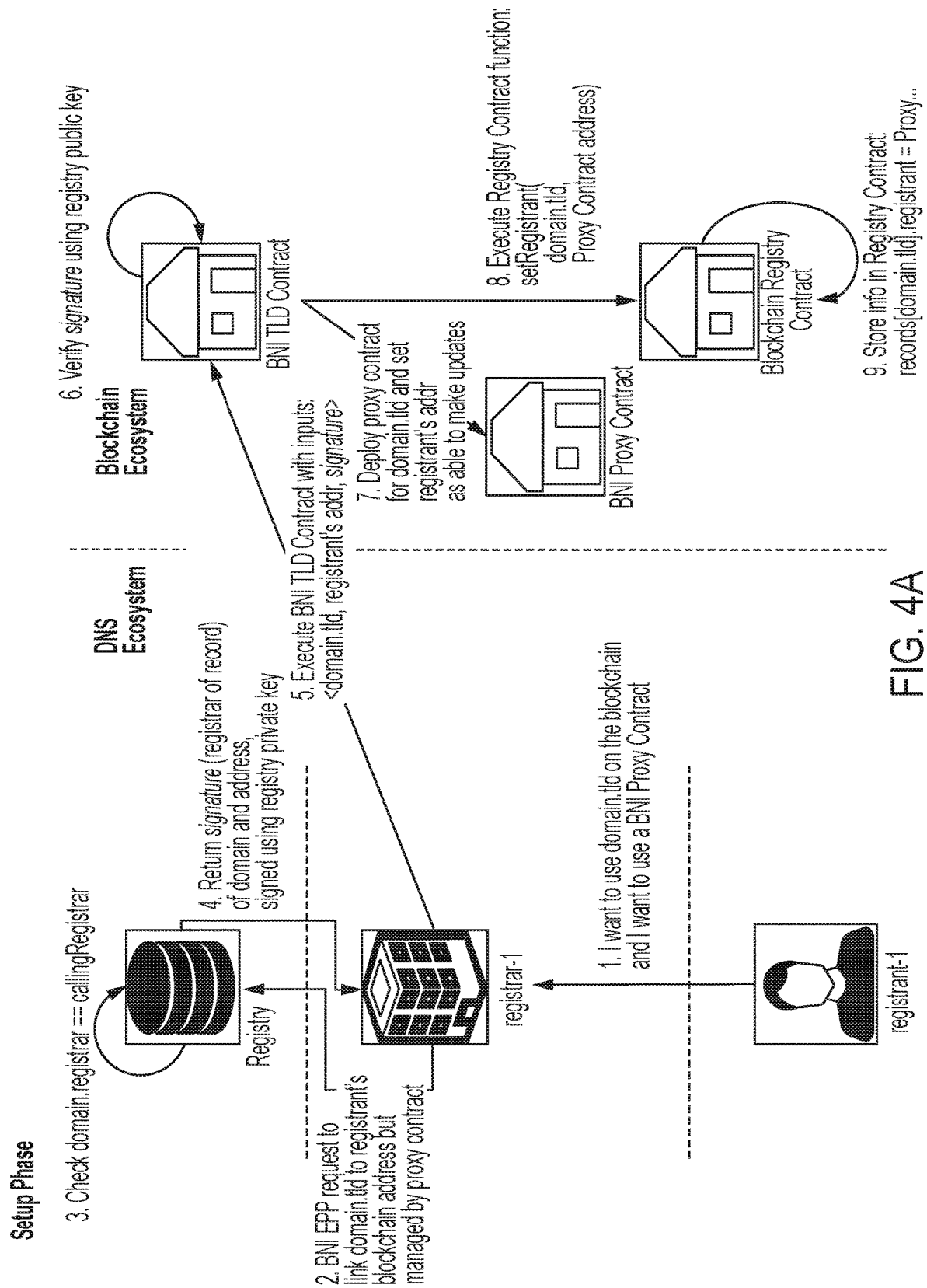
FIGS. 4A and 4B are sequence diagrams illustrating a BNI smart contract proxy, according to particular embodiments.
Figure 4B:
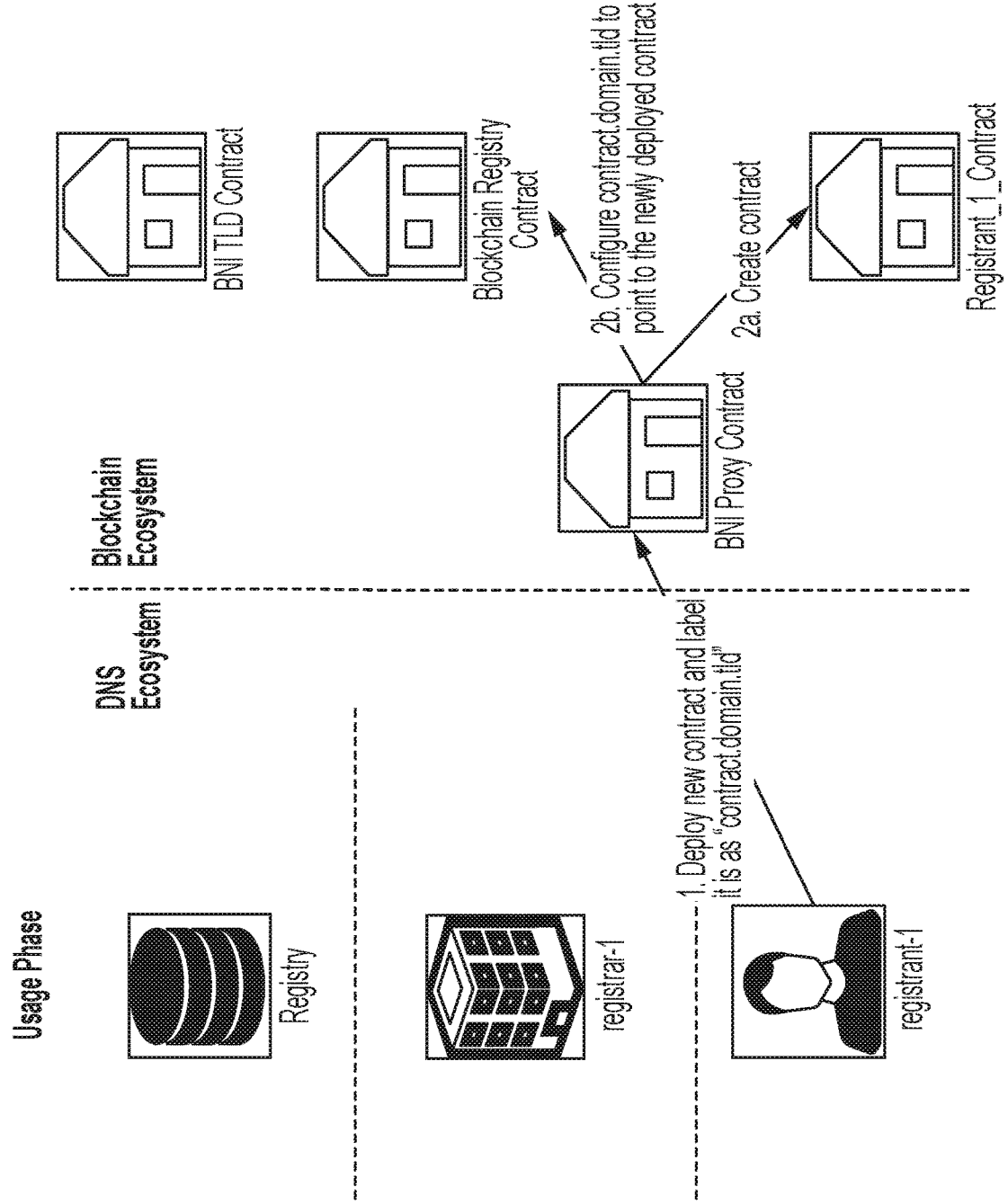

FIGS. 4A and 4B are sequence diagrams illustrating a smart contract proxy, according to particular embodiments. In the illustrated example, when a blockchain identifier is deployed via BNI, a registrant of the corresponding domain name may be offered a proxy contract that provides functionality to both deploy a new contract and set a subsequent blockchain identifier for that contract in the same transaction; e.g., deploy (contract_bytecode, name). For example, the subsequent blockchain identifier may correspond to a third level domain of the registrant's second level domain. Accordingly, the registrant may deploy a contract to the blockchain and set the subsequent blockchain identifier using the proxy contract without having to interact with the RRR-channel directly (e.g., without interacting with the registrar or the registry via the registrar). According to an embodiment, the authorized service provider, such as the DNS Provider or registry, may synchronize the subsequent blockchain identifier into DNS by linking the subsequent blockchain identifier with the corresponding domain name and/or blockchain address.

FIG. 4A illustrates a setup phase of the embodiment. Any changes to the Blockchain Registry Contract for the domain name flow through the proxy contract. Alternative arrangements are possible (e.g., proxy and registrant authorized), but are not explicitly illustrated in FIG. 4A.

FIG. 4B illustrates the usage phase. According to an embodiment, approval to create the subsequent blockchain identifier for the smart contract is implied by deployment of the proxy contract. For example, after the proxy contract is setup, registrant-1 may both deploy and name a contract via the proxy contract, such as by sending invocation information (e.g., a bytecode, optional contract initialization values, and the blockchain identifier for the contract) to the proxy contract. Prior to deploying the blockchain identifier, the proxy contract may be configured to validate that the invocation information acceptable and/or confirm the entity attempting to invoke execution of the proxy contract is permitted to invoke execution of the proxy contract. The entity attempting to invoke execution of the proxy contract may be charged the processing fee regardless of whether the validation and/or confirmation is successful to execute the proxy contract to deploy the blockchain identifier for the smart contract. According to an embodiment, a service provider may sync changes to the blockchain changes back into DNS, such as by linking the blockchain identifier with the corresponding domain name in the DNS.

Figure 5A:
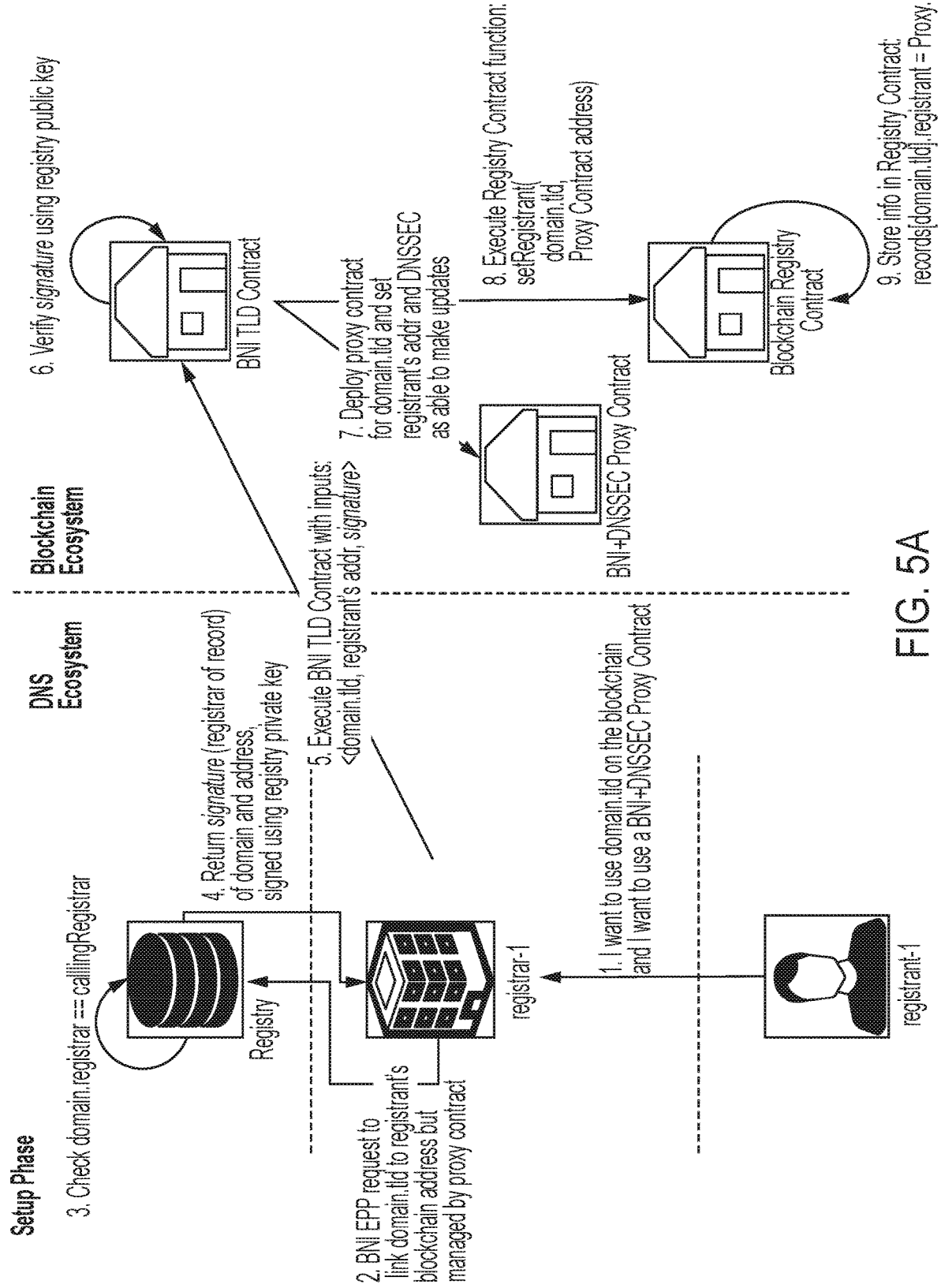
FIGS. 5A and 5B are sequence diagrams illustrating a BNI DNS (SEC) Proxy, according to particular embodiments.
Figure 5B:
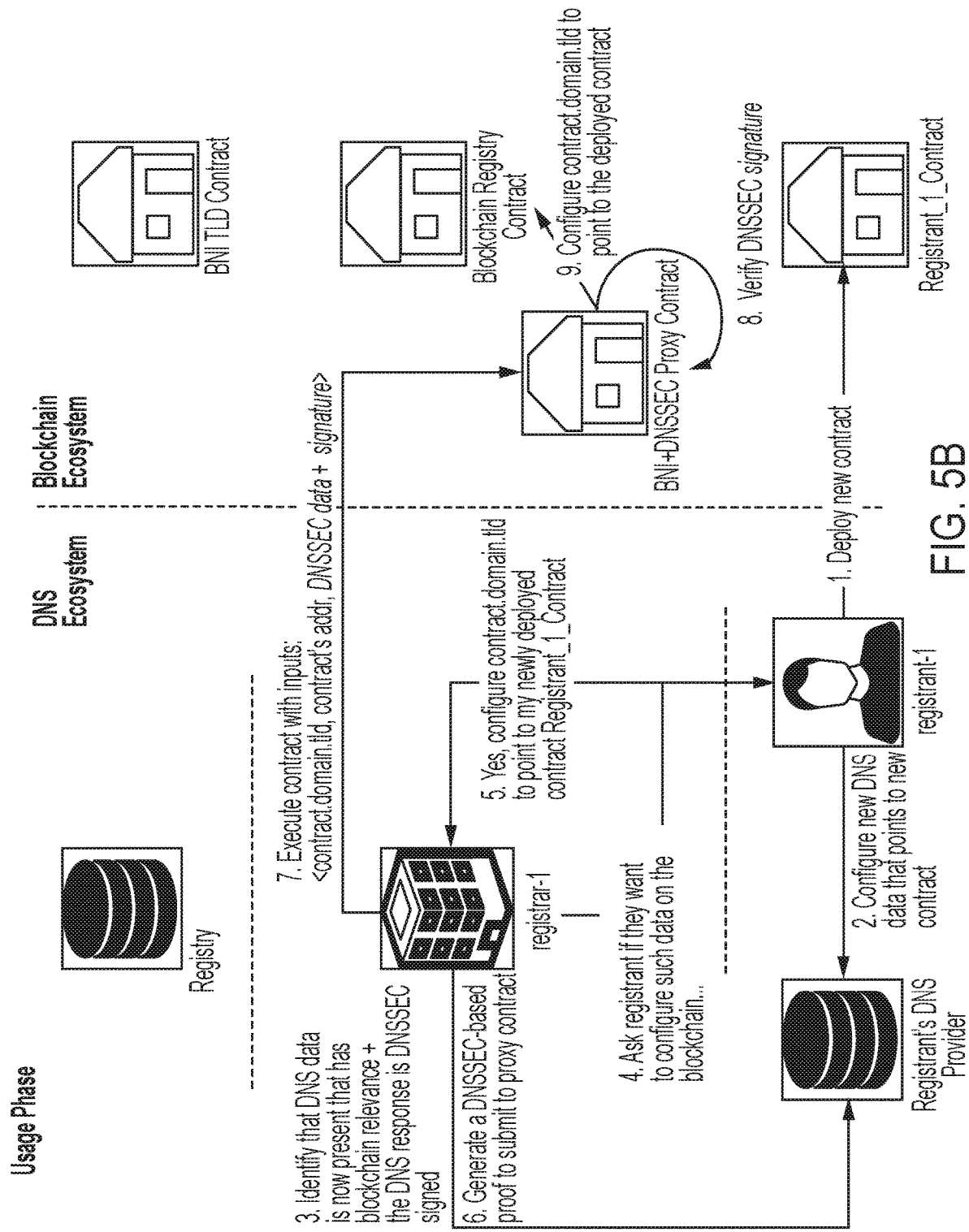

FIGS. 5A and 5B are sequence diagrams illustrating a DNS Security Extensions (DNSSEC) Proxy, according to particular embodiments. In the illustrated example, service provider(s) may monitor any blockchain identifier's corresponding DNS records to identify when a DNS record associated with the blockchain address and/or blockchain identifier is added (e.g., a specific TXT record associated with the blockchain address and/or blockchain identifier is added to the DNS record). Once added, the service provider(s) may automatically add the subdomain to the blockchain, or prompt the registrant to add the subdomain to the blockchain, such as via the BNI approach.

The proof used may be a combination of BNI and DNSSEC, DNSSEC-only, or BNI-only depending on what proofs the Signature Verification (SigVer) program, such as the SigVer program of the BNI approach, will accept and if DNSSEC is enabled for a domain name.

One caveat is that some naming systems, such as ENS, may only allow the owner account (associated with the blockchain identifier) or those authorized by the owner to set blockchain identifiers corresponding to the subdomains. If the registrant is the owner, then the SigVer contract may need to be authorized by the owner account to act on the registrant's behalf as an authorized account. If the SigVer contract is the owner, then the SigVer contract may expose a user interface to set the registrant as an authorized account.

According to an embodiment, if not using DNSSEC, the service provider may act as an attester as to the value observed in the DNS records associated with the blockchain address and/or blockchain identifier.

FIG. 5A illustrates the setup phase. The illustrated example is similar to proxy contract of FIG. 4A with addition of a DNSSEC-based prover. For example, the DNSSEC-based prover is configured to validate that DNSSEC data and/or proofs are valid.

FIG. 5B illustrates the usage phase. According to an embodiment, the registrar may act as both the DNS provider and the service provider. In this case, for example, this vantage point gives the registrar the ability to determine when one or more subdomains are added and if the subdomains may have relevance as a blockchain identifier.

Any embodiments that also include a BNI-based proof may look similar to other embodiments that leverage BNI (e.g., BNI, DNSSEC, or a combination of BNI and DNSSEC) and are not illustrated here.

Figure 6A:
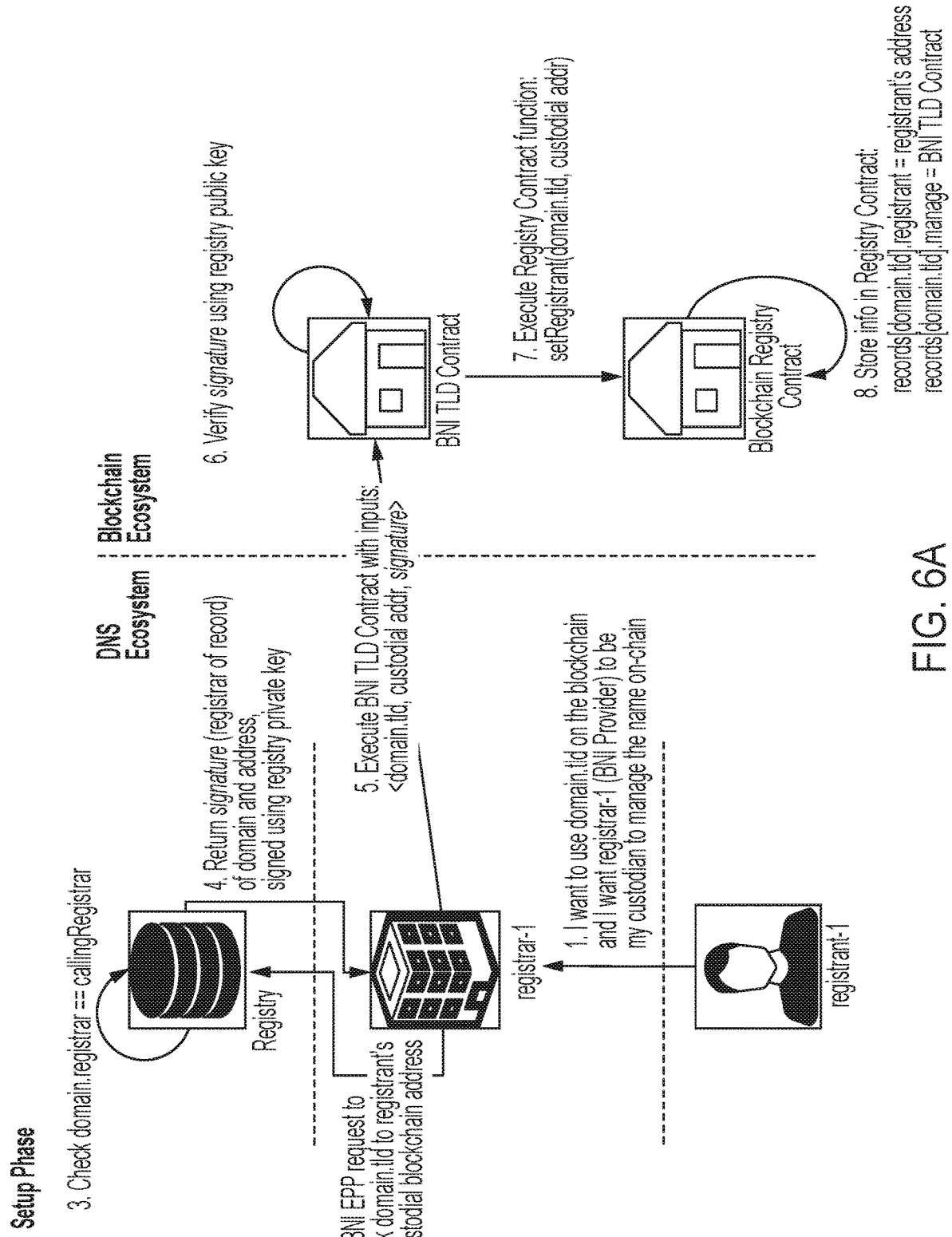
FIGS. 6A and 6B are sequence diagrams illustrating a BNI provider as a wallet, according to particular embodiments.
Figure 6B:
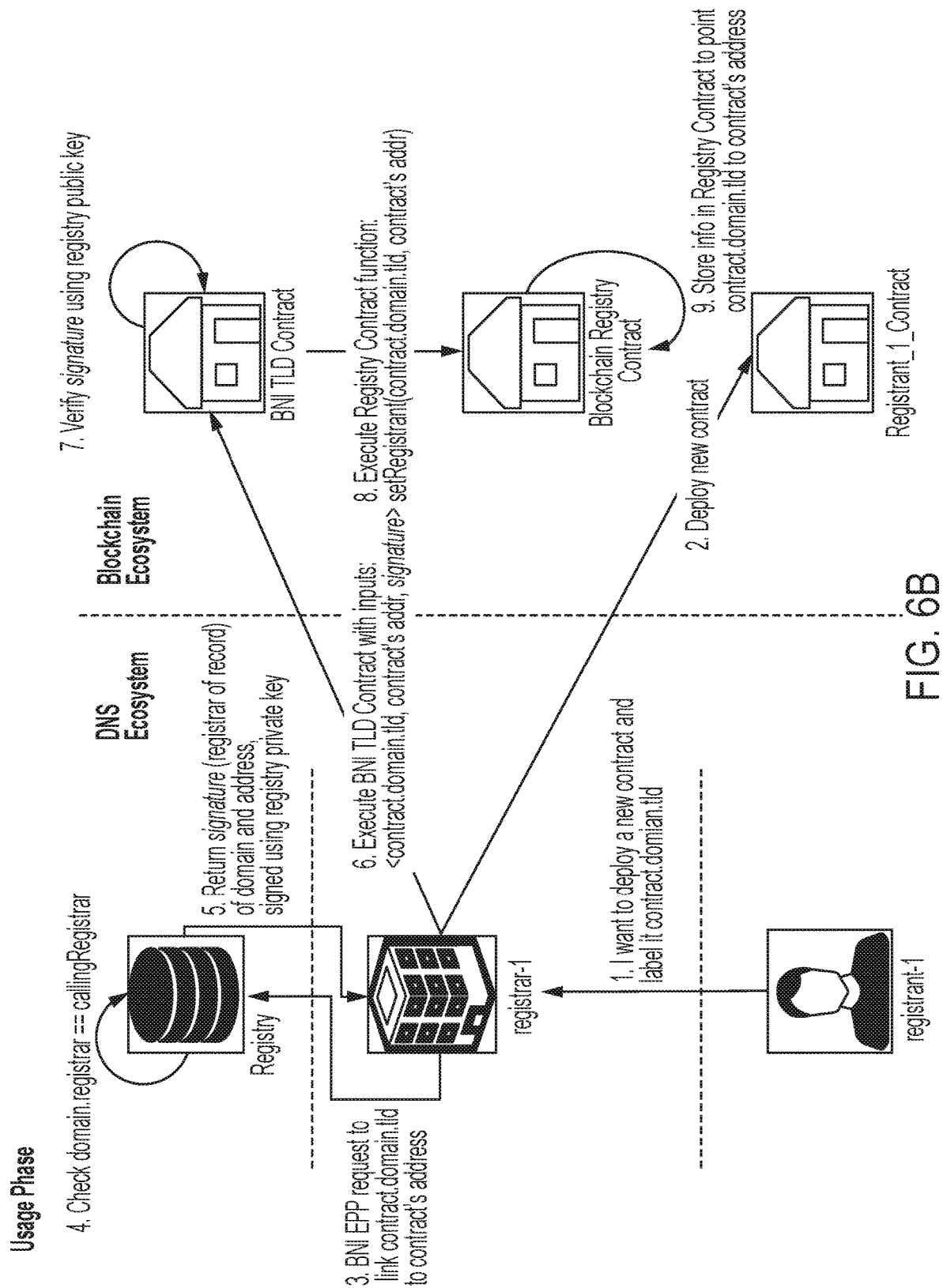

FIGS. 6A and 6B are sequence diagrams illustrating a service provider as a blockchain wallet, according to particular embodiments. In the illustrated example, the registrant may use the service provider as registrant's crypto-wallet and/or custodian for registrant's blockchain-based assets. In this embodiment, the service provider (e.g., registrar) may expands its UI/UX to enable deployment of contracts to the blockchain and setting of blockchain identifiers to identify the contract at the same time.

This embodiment facilitates a hands-off approach for registrants that are not interested or able to personally manage its blockchain-assets. In some embodiments, the registrant need not have any native blockchain presence if the registrant defers completely to the service provider.

FIG. 6A illustrates the setup phase, and FIG. 6B illustrates the usage phase. Registrar-1 has functionality to deploy a contract (on behalf of registrant-1) and also interact with the traditional RRR-channel.

Figure 7A:
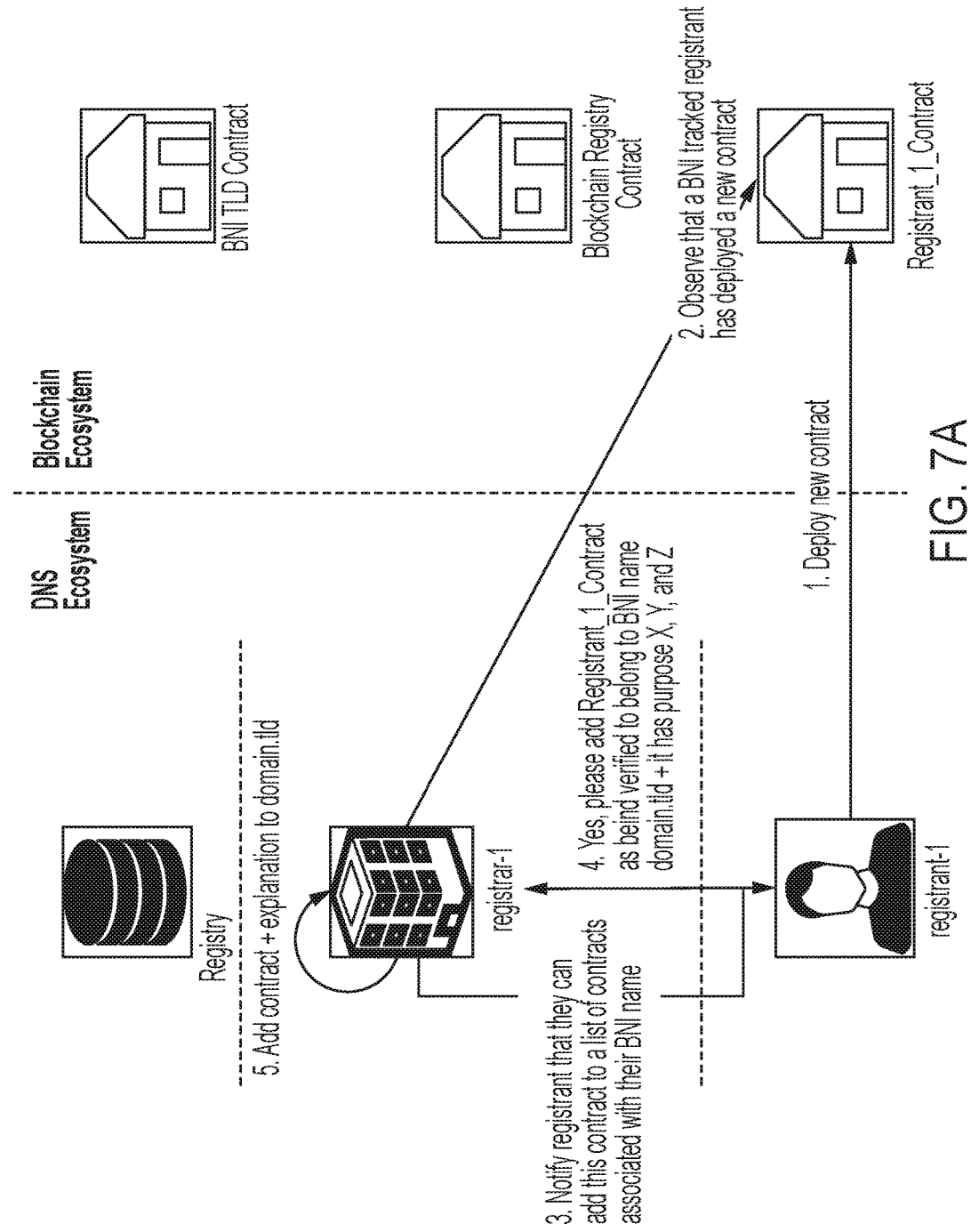
FIGS. 7A and 7B are sequence diagrams illustrating a BNI provider as a contract tracker, according to particular embodiments.
Figure 7B:
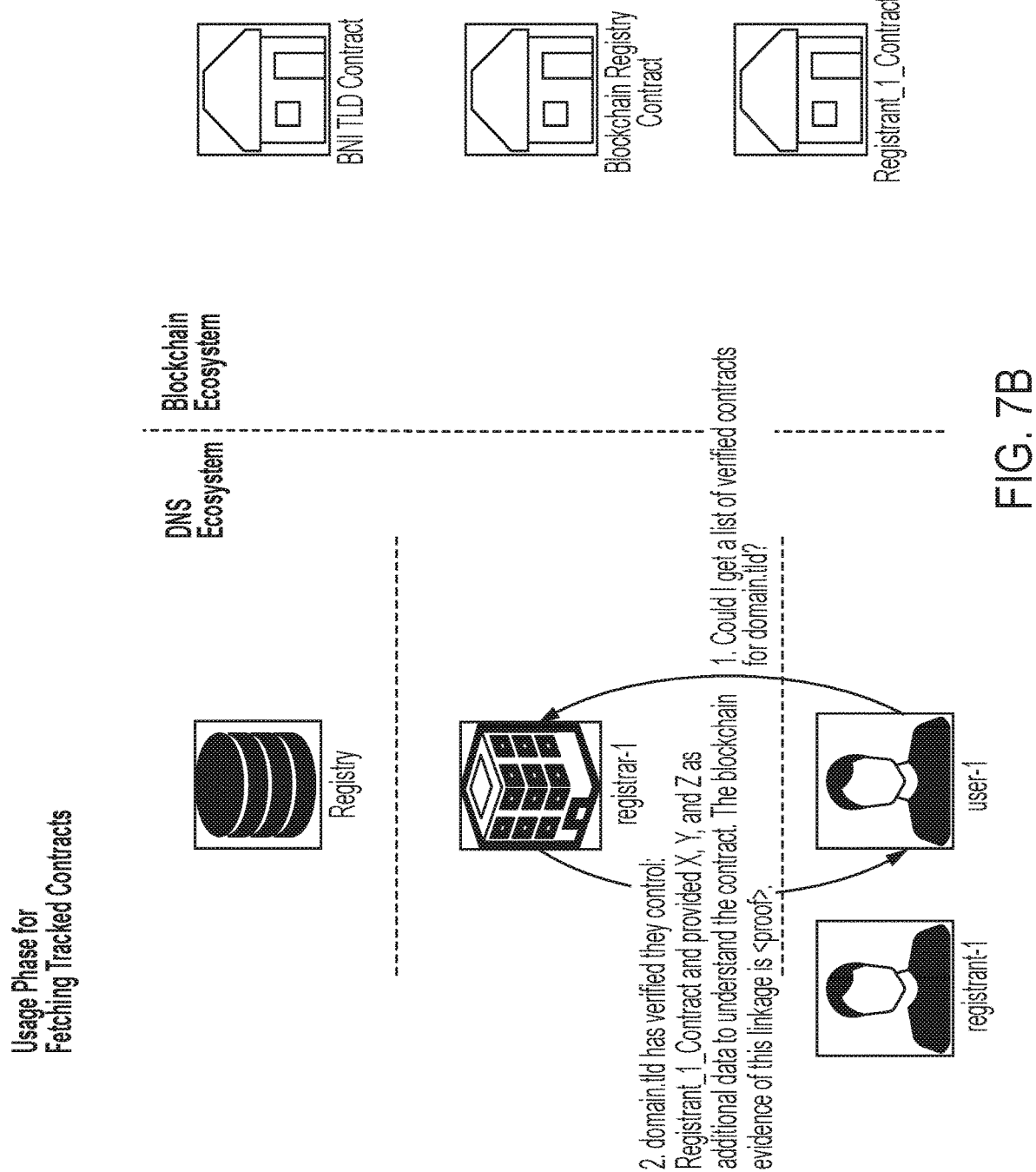

FIGS. 7A and 7B are sequence diagrams illustrating a service provider as a contract tracker, according to particular embodiments. In the illustrated example, a service provider may monitor a tracked blockchain identifier for any contract deployments and automatically add (or request the registrant confirm) those to a list of contracts associated with that address. Then users may request the list (for some source) to see contracts deployed by a given account.

According to an embodiment, the service provider may provide a transaction hash or other form of strong proof that shows the contract deployment came from the tracked blockchain identifier (e.g., to prove that the contract came from a particular account). For example, a strong proof may be evidence that references one or more blockchain actions (or other cryptographically traceable sources, such as DNSSEC) that can be independently evaluated or validated without having to trust the entity that provides the proof.

According to an embodiment, contracts/addresses that were not created by the service provider to be linked with a blockchain identifier but the proof may be different than the strong proof described above. For example, the proof may be weak proof, such as an attestation from the registrant (e.g., the registrant of the domain name corresponding to the blockchain identifier) using its existing key. For example, a weak proof may be an attestation that something is true, but the attesting party (e.g., the registrant) may not provide independently evaluatable or validatable evidence that the assertion is true beyond the attestation itself. In such cases, users are trusting both the service provider and the blockchain identifier to make true assertions.

In both cases, the service provider may verify what the contract is or if the blockchain identifier actually owns, controls, and/or manages the contract. Instead, the assertion may be constrained to the contract, which was deployed or attested to be controlled by the blockchain identifier.

According to an embodiment, the list of contracts associated with a blockchain address may be added to a blockchain resolver (e.g., for blockchain native support for resolving blockchain identifiers to blockchain addresses) or may be tracked off the blockchain via a service provider. For example, the registry may track or point to a tracking entity that tracks such information (e.g., the list of contracts associated with a blockchain) and that would expose or identify an end point to fetch such information, such as a registration data directory service (RDDS) or other registration data repository. As one example, the list of contracts associated with a blockchain address may be 0x123 being affiliated with contracts 0x444, 0x555, 0x999, etc. As another example, it may also be a case that 0x123 is affiliated with a domain identifier example.com. In some embodiments, such information may be stored off the blockchain and may be paired with proofs that can be evaluated on-chain to support blockchain resolution (or other blockchain operations) based on this off-chain data (i.e., such information stored off the blockchain). In particular, being paired with proofs provides the off-chain data a means to be evaluated on-chain. For example, upon providing an off-chain list, a signature over the off-chain list, which serves as a proof, and a smart contract on-chain may check that the list and the proof are signed by appropriate key material of an off-chain provider.

For example, viewing a list of transactions from a given account (such as contract deployments) may not currently be supported using existing functionality, such as remote procedure call (RPC) calls. Instead, a user may need to access or view the entire blockchain or use a third-party service that tracks transactions made by a given account to view the deployed contracts. In this role, a service provider is fulfilling the role of a third-party service.

According to an embodiment, the setup phase for tracking contracts may be the same or similar to the setup illustrated in FIG. 1B. FIG. 7A illustrates the usage phase for tracking contracts. FIG. 7B illustrates the usage phase for fetching tracked contracts, such as for interacting with the service provider (e.g., via an application programming interface (API) or webpage) to fetch a domain name with any associated or linked contracts (e.g., using HTTP GET). Supported queries and responses from a service provider may be configurable, e.g., limited to specific questions (domain.tld, contract_x) or broader than illustrated.

Although the service provider may be generally illustrated as part of the registrar in the illustrated examples, in particular embodiments the service provider may be provided by the registry or a standalone component of the DNS system.

Some embodiments may include any one or more of the following additional features.

In some embodiments, third parties, such as BNI or service providers, may provide a UI/UX that enables users to search BNI based names or blockchain identifiers and return criteria that match the name or other supported fields (such as optionally provided contract descriptions). This assists users to quickly find names affiliated with a given blockchain identifier (if they exist).

In some embodiments, other fields may be provided by registrants that help users understand what a contract does. For example, a small description for the contract, a uniform resource identifier (URI) to an external description of the contract, or the application binary interface (ABI) to interact with the contract may be specified. These fields may be provided during deployment or as a subsequent update to a contract as needed. According to an embodiment, the fields may be stored at the service providers and/or on the blockchain (e.g., in the proxy contract).

In some embodiments, if a service provider deploys the contract, the service provider may also submit the contract for verification to an auditor as part of the deployment to further enhance trust.

In some embodiments, Registration Data Access Protocol (RDAP) signatures or similar concepts may be used to fetch and submit the information to the SigVer program on the blockchain. By way of non-limiting examples, the SigVer program may use off-chain data backed by signatures, proofs, attestations, or similar to facilitate other parts of this invention or to support blockchain resolution using this off-chain data.

In some embodiments, a confirmation step may be specified for blockchain identifiers deployed without a registrant signature as a step to confirm that the blockchain identifier should be linked to the address in question. According to an embodiment, the parent domain name (not the subdomain or path) may be consulted to approve any blockchain identifier (which corresponds to a subdomain) creation associated with a contract. This may ensure that an account with a human user can confirm or deny the linkage request.

According to an embodiment, the contract itself may expose or identify a function that allows an authorized user of the domain name (not the subdomain or path) to finalize the linkage with a blockchain identifier and/or blockchain address, e.g., finalizeSubdomain (subdomain), such that the step only succeeds if the first BNI-based attempt to link the two was created.

Particular embodiments provide one or more technical advantages. For example, particular embodiments extend BNI to automatically set subdomains and paths for newly deployed contracts or keep track of contracts associated with a given blockchain identifier (e.g., deployed by or attested by the BNI name). Additionally, some embodiments may include a search interface, support for additional descriptive fields, use of RDAP signature, and second factors to finalize the linkage.

Some embodiments describe actions as linking one contract with one identifier, such as domain, subdomain, path, etc. However, explanatory examples are not limited to such actions, indeed, such actions may be batched together such that multiple contracts and identifiers are supported in a single flow.

Those skilled in the art can extend such methods to support configuring multiple contracts to multiple subdomains, domains, or path-based solutions by replacing the single request, e.g., "<identifier, contract>", with a list of requested mappings, e.g., "[<id, contract>, <id, contract>, . . . ]" or a similar list of inputs as needed (i.e., some parts of the specification support adding one or more optional fields for more data).

By way of non-limiting example, in some embodiments, proofs or attestations as mentioned throughout this specification could be based on Web PKI infrastructure, blockchain signatures, decentralized identifiers, verifiable credentials, signatures from a BNI provider, or other similar methods.

Some embodiments provide BNI with more capabilities and UI/UX value that would make BNI-based names more desirable compared to non-BNI names. Particular embodiments also range from more to less blockchain native depending on the desired level of blockchain integration (scalable based on the BNI provider, the registrant, and the potential targeted users).

In some embodiments, service providers may monitor BNI names for contract deployments and then prompt the registrant if they want to attach a subdomain/path-based name to that contract.

In some embodiments, service providers may give registrants an (optional) proxy contract that both assists in contract deployment and automates naming of those contracts.

In some embodiments, service providers may monitor a BNI name's DNS records for the presence of blockchain related DNS records and then (optionally) automatically add those records to the blockchain using the BNI SigVer and some combination of acceptable proofs.

In some embodiments, a service provider may enhance their UI/UX to support deploying contracts and naming those contracts at the same time (essentially acting as a custodian for the user's crypto name and possibly even their crypto presence).

In some embodiments, a service provider may track contract deployments and add the contract deployments to a list of contracts deployed by the tracked BNI-based account.

Some embodiments may include a search-based portal to explore BNI-based name and contracts (based on the information stored on the blockchain or provided by the BNI-providers).

Some embodiments may include additional descriptive fields that may be included in deployments to better define the subdomain and the purpose of the contract.

In some embodiments, if the BNI provider deploys the contract, the BNI provider may also submit the contract to a validation service to verify the contract.

In some embodiments, the SigVer program may use RDAP signatures (or similar RDDS signatures) in lieu of or in addition to the Registrar of Record style proofs described in the BNI.

The service provider may be implemented on one or more servers, such as the apparatus described with respect to FIG. 8.

FIG. 8 illustrates an example of an apparatus to implement one or more example embodiments discussed herein. In this example, the apparatus 800 may include one or more processors 802, memory 803, one or more input devices, and one or more output devices 805. The apparatus 800 may be a computer.

In one embodiment, the one or more processors 802 may include a general purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

In one example, based on user input 801 and/or other input 801 from a computer network, the one or more processors 802 may execute instructions stored in memory 803 to perform one or more exemplary embodiments described herein. The input 801 may be received in conjunction with one or more input devices (not shown) of the apparatus 800. Output produced by the one or more processors 802 executing the instructions may be output on the one or more output devices 805 and/or output to the computer network.

The memory 803 may be accessible by the one or more processors 802 via the link 804 so that the one or more processors 802 can read information from and write information to the memory 803. Memory 803 may be integral with or separate from the processors. Examples of the memory 803 include RAM, flash, ROM, EPROM, EEPROM, registers, disk storage, or any other form of storage medium. The memory 803 may store instructions that, when executed by the one or more processors 802, implement one or more embodiments of the invention. Memory 803 may be a non-transitory computer-readable medium that stores instructions, which when executed by a computer, cause the computer to perform one or more of the exemplary methods discussed herein.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Embodiments illustrated under any heading or in any portion of the disclosure may be combined with embodiments illustrated under the same or any other heading or other portion of the disclosure unless otherwise indicated herein or otherwise clearly contradicted by context. For example, and without limitation, embodiments described in dependent claim format for a given embodiment (e.g., the given embodiment described in independent claim format) may be combined with other embodiments (described in independent claim format or dependent claim format).

Numerous modifications, alterations, and changes to the described embodiments are possible without departing from the scope of the present invention defined in the claims. It is intended that the present invention is not limited to the described embodiments, but that it has the full scope defined by the language of the following claims, and equivalents thereof.

What is claimed is:

1. A computer-implemented method performed by a service provider computer, the service provider computer comprising one or more processors and memory accessible by the one or more processors, the memory storing instructions that when executed by the one or more processors, cause the service provider computer to perform the computer-implemented method, the computer-implemented method comprising:

receiving, from a registrant, a first request to associate a domain name with a blockchain address;

transmitting the first request to a registry, wherein the registry is configured to digitally sign data from the first request or transformation of the data from the first request;

submitting a transaction that includes the digitally signed data from the first request or transformation of the data from first request to a first blockchain contract, wherein the first blockchain contract is configured to store the associated domain name as a first blockchain identifier;

receiving a second request from the registrant to deploy a second blockchain contract, wherein the second request includes an indication of a subdomain of the associated domain name to use as a second blockchain identifier for the second blockchain contract; and deploying the second blockchain contract on behalf of the registrant, wherein the second blockchain identifier is associated with a blockchain address of the second blockchain contract.

2. The computer-implemented method of claim 1, wherein the first request comprises an indication to use a proxy blockchain contract, wherein the proxy blockchain contract is a blockchain contract controlled by a third party.

3. The computer-implemented method of claim 1, wherein the first request further comprises an indication for a registrar to be a custodian for the registrant on the first blockchain contract.

4. A computer-implemented method performed by a service provider computer, the service provider computer comprising one or more processors and memory accessible by the one or more processors, the memory storing instructions that when executed by the one or more processors, cause the service provider computer to perform the computer-implemented method, the computer-implemented method comprising:
   receiving a first request from a registrant to associate a domain name with a blockchain address;
   transmitting the first request to a registry, wherein the registry is configured to digitally sign data from the first request or transformation of the data from the first request;
   submitting a first transaction that includes the digitally signed data from the first request or transformation of the data from the first request to a first blockchain contract, wherein the first blockchain contract is configured to store the associated domain name as a first blockchain identifier;
   determining a deployment of a second blockchain contract by the registrant;
   provifing a notification for the registrant to associate a subdomain of the associated domain name as a second blockchain identifier for the second blockchain contract;
   receiving, from the registrant, an indication to use the subdomain as the second blockchain identifier for the second blockchain contract;
   transmitting a second request to the registry, wherein the second request is based on the notification, and wherein the registry is configured to digitally sign data from the notification or transformation of the data from the notification; and
   submitting a second transaction that includes the digitally signed data from the notification or transformation of the data from the notification to the second blockchain contract, wherein the second blockchain contract is configured to store the associated subdomain name as the second blockchain identifier.

5. The computer-implemented method of claim 4, further comprising: monitoring a blockchain for an indication that the registrant deployed the second blockchain contract.

6. The computer-implemented method of claim 4, further comprising: monitoring a domain name system (DNS) record for addition of a record having a blockchain information.

7. A system comprising:
   one or more processors; and
   memory storing instructions that, when executed by the one or more processors, cause the one or more processors to perform operations comprising:
   receiving a first request from a registrant to associate a domain name with a blockchain address;
   transmitting the first request to a registry, wherein the registry is configured to digitally sign data from the first request or transformation of the data from the first request;
   submitting a first transaction that includes the digitally signed data from the first request or transformation of the data from the first request to a first blockchain contract, wherein the first blockchain contract is configured to store the associated domain name as a first blockchain identifier;
   determining a deployment of a second blockchain contract by the registrant;
   providing a notification for the registrant to associate a subdomain of the associated domain name as a second blockchain identifier for the second blockchain contract;
   receiving, from the registrant, an indication to use the subdomain as the second blockchain identifier for the second blockchain contract;
   transmitting a second request to the registry, wherein the second request is based on the notificaiton, and wherein the registry is configured to digitally sign data from the notification or transformation of the data from the notification; and
   submitting a second transaction that includes the digitally signed data from the notification or transformation of the data from the notification to the second blockchain contract, wherein the second blockchain contract is configured to store the associated subdomain name as the second blockchain identifier.

8. The system of claim 7, the operations further comprising: monitoring a blockchain for an indication that the registrant deployed the second blockchain contract.

9. The system of claim 7, the operations further comprising: monitoring a domain name system (DNS) record for addition of a record having a blockchain information.

10. One or more non-transitory computer-readable media storing computer executable instructions that, when executed, cause one or more processors to perform operations comprising:
    receiving, from a registrant, a first request to associate a domain name with a blockchain address;
    transmitting the first request to a registry, wherein the registry is configured to digitally sign data from the first request or transformation of the data from the first request;
    submitting a transaction that includes the digitally signed data from the first request or transformation of the data from first request to a first blockchain contract, wherein the first blockchain contract is configured to store the associated domain name as a first blockchain identifier;
    receiving a second request from the registrant to deploy a second blockchain contract, wherein the second request includes an indication of a subdomain of the associated domain name to use as a second blockchain identifier for the second blockchain contract; and
    deploying the second blockchain contract on behalf of the registrant, wherein the second blockchain identifier is associated with a blockchain address of the second blockchain contract.

11. The one or more non-transitory computer-readable media of claim 10, wherein the first request comprises an indication to use a proxy blockchain contract, wherein the proxy blockchain contract is a blockchain contract controlled by a third party.

12. The one or more non-transitory computer-readable media of claim 10, wherein the first request further comprises an indication for a registrar to be a custodian for the registrant on the first blockchain contract.

\* \* \* \* \*